US006557029B2

(12) United States Patent
Szymansky

(10) Patent No.: US 6,557,029 B2
(45) Date of Patent: Apr. 29, 2003

(54) SYSTEM AND METHOD FOR DISTRIBUTING MESSAGES

(75) Inventor: Roman Szymansky, West Milford, NJ (US)

(73) Assignee: Micro Design Services, LLC, Parsippany, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,545

(22) Filed: Jun. 28, 1999

(65) Prior Publication Data

US 2002/0099788 A1 Jul. 25, 2002

(51) Int. Cl.[7] .......................... G06F 15/16; G06F 12/60

(52) U.S. Cl. ....................... 709/206; 709/217; 709/219; 705/37; 705/26

(58) Field of Search ................................ 709/200, 217, 709/219, 224, 206; 705/35, 37, 26, 36, 38; 455/517

(56) References Cited

U.S. PATENT DOCUMENTS 4,677,552 A * 6/1987 Sibley, Jr. .................. 364/408
4,980,826 A * 12/1990 Wagner ...................... 364/408
5,561,446 A * 10/1996 Montlick .................... 345/173
5,715,393 A * 2/1998 Naugle ....................... 709/224
5,774,877 A 6/1998 Patterson, Jr. et al.
5,797,002 A * 8/1998 Paterson, Jr. et al. ......... 705/35
5,819,110 A * 10/1998 Motoyama ................... 710/15
5,915,245 A * 6/1999 Patterson, Jr. et al. ........ 705/35
6,014,429 A * 1/2000 LaPorta et al. .......... 379/88.15
6,014,643 A * 1/2000 Minton ........................ 705/37
6,085,101 A * 7/2000 Jain et al. .................. 455/500

* cited by examiner

*Primary Examiner*—Glenton B. Burgess
*Assistant Examiner*—Abdullahi E. Salad
(74) *Attorney, Agent, or Firm*—Katten Muchin Zavis Rosenman

(57) ABSTRACT

A system and a method for distributing messages from mobile users over a communication network in real time. In the preferred embodiment, mobile users would enter information in handwritten form on a touch-sensitive screen using a stylus. The handwritten messages would be converted into a graphics format and then transmitted (using a suitable protocol) to a computer server. The computer server would store the graphic files in a database and also transmit the graphic files to subscribers.

13 Claims, 4 Drawing Sheets

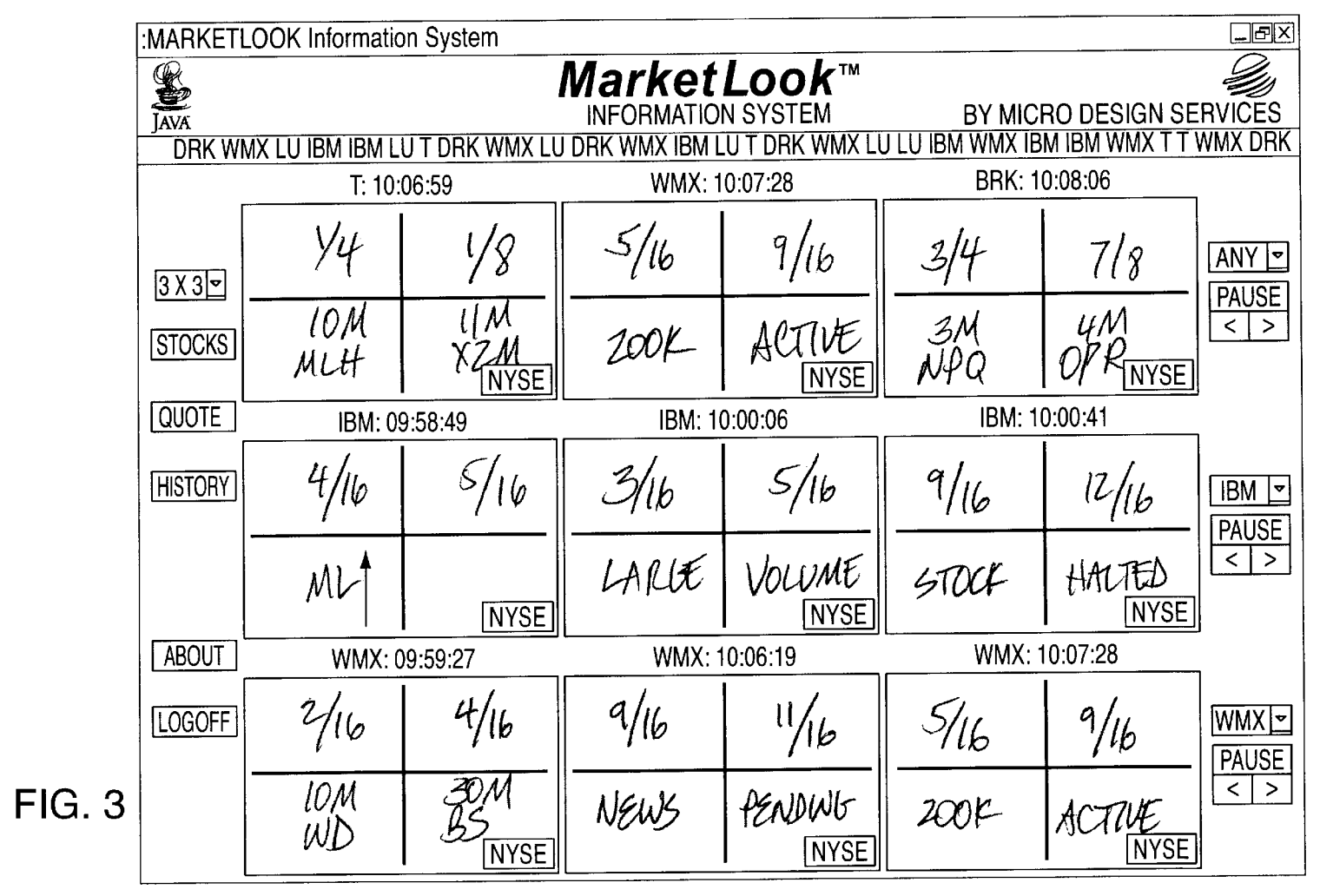

:MARKETLOOK Information System

MarketLook™
INFORMATION SYSTEM
BY MICRO DESIGN SERVICES

DRK WMX LU IBM IBM LU T DRK WMX LU DRK WMX IBM LU T DRK WMX LU LU IBM WMX IBM IBM WMX T T WMX DRK

3 X 3
STOCKS
QUOTE
HISTORY
ABOUT
LOGOFF

T: 10:06:59 | WMX: 10:07:28 | BRK: 10:08:06
IBM: 09:58:49 | IBM: 10:00:06 | IBM: 10:00:41
WMX: 09:59:27 | WMX: 10:06:19 | WMX: 10:07:28

NYSE

ANY
IBM
WMX
PAUSE
< >

FIG. 3

SYSTEM AND METHOD FOR DISTRIBUTING MESSAGES

FIELD OF THE INVENTION

The present invention relates generally to the field of distributing messages over a communication network.

BACKGROUND OF THE INVENTION

Brokers who work on the floor of a modern stock or commodity exchange, such as the New York Stock Exchange, must have the ability to be on their feet and communicate with other persons on the floor of the exchange. Among a floor broker's other duties, the floor broker has to be able to memorialize transactions and provide quotations. In particular, it is often advantageous if a broker can provide a free-flow of information to a trading desk or persons who are located physically off the exchange floor. However, the New York Stock Exchange and other major exchanges (including commodity exchanges) in accordance with Federal law prohibit a floor broker from directly communicating with any person off the floor. In addition, a nonmember cannot enter an order directly with a broker on the floor of the exchange.

Instead, the floor broker must communicate with the trading booth on the floor of the exchange. The clerk in the trading booth is then permitted to speak with the trading desk. (This is commonly known as the "kiss-the-booth" rule.) The kiss the booth rule also works in the reverse direction. That is, if the trading desk wishes a market quote from a floor broker, the trading desk would telephone the clerk in booth who would then ask the floor broker for the market quote.

There are several different methods by which the floor broker and the clerk in the booth communicate.

In accordance with a first method, the floor broker would physically go to the booth and give the clerk a slip of paper. In other instances, (depending on exchange rules) the clerk would enter onto the floor to retrieve the slip of paper. In still other instances, messengers or runners would physically carry slips of paper between the floor brokers and clerks in the booth.

In accordance with a second method, the floor broker would communicate with the clerk in the booth by using a portable telephone (such as a cellular telephone).

In accordance with a third method, the clerk in the booth would listen to the activity on the floor of the exchange and would provide information to the trading desk based on what the clerk heard.

In accordance with a fourth method, the floor broker could convey information to a clerk, verbally or otherwise. That clerk could then make hand signals to the clerk in the trading booth.

In accordance with a fifth method, the floor broker himself would communicate with the clerk in the booth by using hand signals. A variation of this method is for a first clerk to receive the information conveyed by the hand signals and then reconvey the information to the second clerk in the booth by again using hand signals.

In all the variations, information may be furnished at the broker's initiative or at the trading desk's initiative. Traditionally, brokers would record information on slips of paper. The brokers would then hand the slips of paper to clerks on the floor of the exchange who would communicate the information in the slips of paper to the trading desk by telephone.

The traditional method described above suffers from various inherent drawbacks. First, the clerk in the booth simply does not have the time to engage in telephone conferences with more than a few individuals. Second, there may be substantial delays in transmitting information to the trading desk because the floor broker has to convey the slips of paper to the clerk, and the clerk has to reconvey this information to the trading desk. Third, the slips of paper are difficult to organize and are frequently lost. This may make it difficult to reconstruct quotes after the fact. This may lead to regulatory problems since many exchanges require that market quotes be preserved as evidence that market orders were executed at a reasonable price.

SUMMARY OF THE INVENTION

A preferred embodiment of the present invention uses hand-held computers with touch-sensitive screens. The information entered on the touch-sensitive screens is converted to graphic files. The graphic files are then transmitted to a computer server that is connected to the local area network of the subscribing firm. Computers that are connected by the local area network would display the handwritten information by using conventional Web browser software.

The preferred embodiment is an improvement over the prior art by permitting a mobile commercial actor, such as a broker, to transmit his customary jottings with almost no additional effort to the trading desk or to any subscriber who has a connected computer terminal. The floor broker can also receive requests from the trading desk with almost no additional effort.

The preferred embodiment also eliminates the delay inherent in the prior art of the broker giving slips of paper to the clerk and the clerk then conveying the information to the trading desk, In addition, the preferred embodiment establishes a system for organizing and storing in a database the information contained in the handwritten jottings.

The preferred embodiment permits quotations and other information to be sent to many different subscribers simultaneously. The over-all effect of the preferred embodiment is that it allows the trading desk or any subscriber who has a connected computer terminal to have access to information as if the individual who works at the trading desk were physically present on the floor of the exchange. As an added benefit, the preferred embodiment permits the reduction in the clerks employed in the floor booth.

In short, the preferred embodiment permits the rapid dissemination of information using electronic medium, yet at the same time complying with applicable rules and regulations

BRIEF DESCRIPTION OF THE DRAWINGS

The disclosure is made more readily understandable by reference to the accompanying drawings in which:

FIG. 3 is a screen shot of a Web browser used in a preferred embodiment of the invention;

DETAILED DESCRIPTION OF A PREFERRED EMBODIMENT

Figure 1:
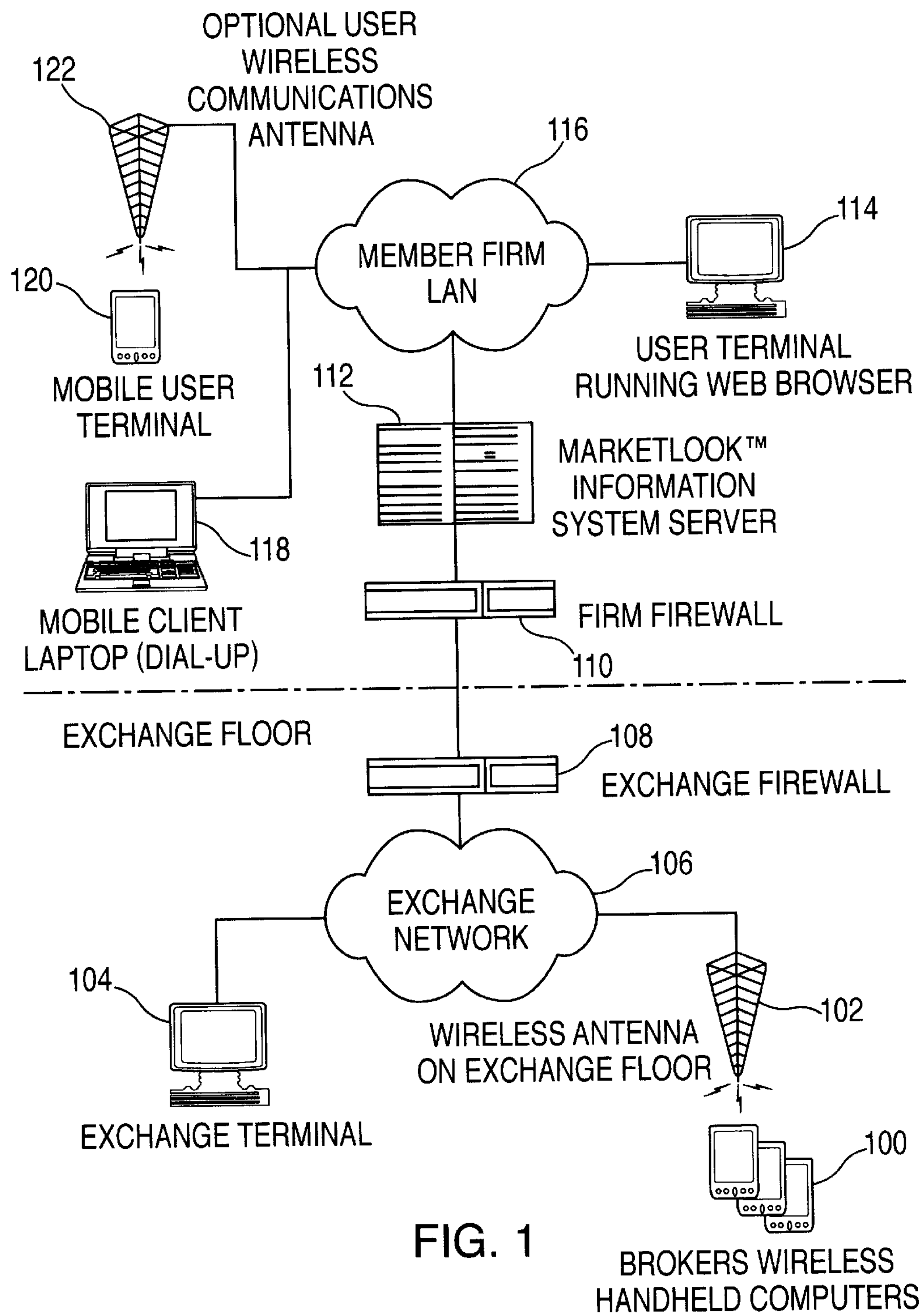
FIG. 1 is a block diagram of the various components of a preferred embodiment of the invention.

Referring to FIG. 1, a floor broker uses wireless hand-held computer 100. Hand-held computer 100 has a touch sensitive screen and a stylus. The floor broker would use the stylus to make a notation such as:

| $61\frac{1}{2}$ | $\frac{5}{8}$ |
|---|---|
| 10 ML | 20 BS |

This notation in the common parlance of the stock exchange means that the bid price for the particular stock is 61½ and that Merrill Lynch is willing to buy 10,000 shares at that price and that the asking price is 61 and Bear Stearns is willing to sell 20,000 shares at that price. (Participants in the financial or commodity markets would understand these handwritten notations).

Naturally, the notation could deal with any sort of information such as the price at which a security is expected to open, which individuals are in the trading crowd or any relevant information about a security.

The notation entered on the touch sensitive screen would be converted by the central processing unit of the hand-held computer 100. Alternatively, the information could be entered with any device suitable for data entry such as a keyboard or a device suitable for voice recognition.

The broker, by pressing a send button would transmit the graphics file to wireless antenna 102 on the floor of the exchange using conventional radio transmission technology. The data would then be transmitted over the exchange's local area network 106 to a router that would convey the data to the subscribing firm's computer server 112. The information would also be displayed in exchange terminal 104, which is located in the booth (in this manner, the "kiss the booth" rule is satisfied). In most cases, the data would first pass through firewall 108 that stands between the exchange's local area network and the outside world and firewall 110 that stands between the subscribing firm's local area network and the outside world. In the preferred embodiment, the data is transferred from the exchange's local area network to the subscribing firm's local area network using Simple Mail Transfer Protocol. However, various different publicly available or proprietary protocols could be used instead of Simple Mail Transfer Protocol.

The computer server 112 is the central unit for the processing of the graphic files that represent the handwritten jottings. Computer server 112 is responsible for organizing, storing and distributing the handwritten jottings. Each graphic file could have coded into it the time that the handwritten jotting was created by the floor broker and the security to which the handwritten jotting relates. It is well known in the computer programming arts of techniques to insert information in a graphic file. In addition, the graphic file itself could be inserted as part of a data packet suitable for transmission over the Internet or a local area network of subscribing firm 116.

The handwritten jottings are distributed to a client terminal 114 running a Web browser. The handwritten jottings could also be conveyed to a mobile client laptop 118 using a dialup connection on to wire hand-held computer 120, using antenna 122.

Figure 2:
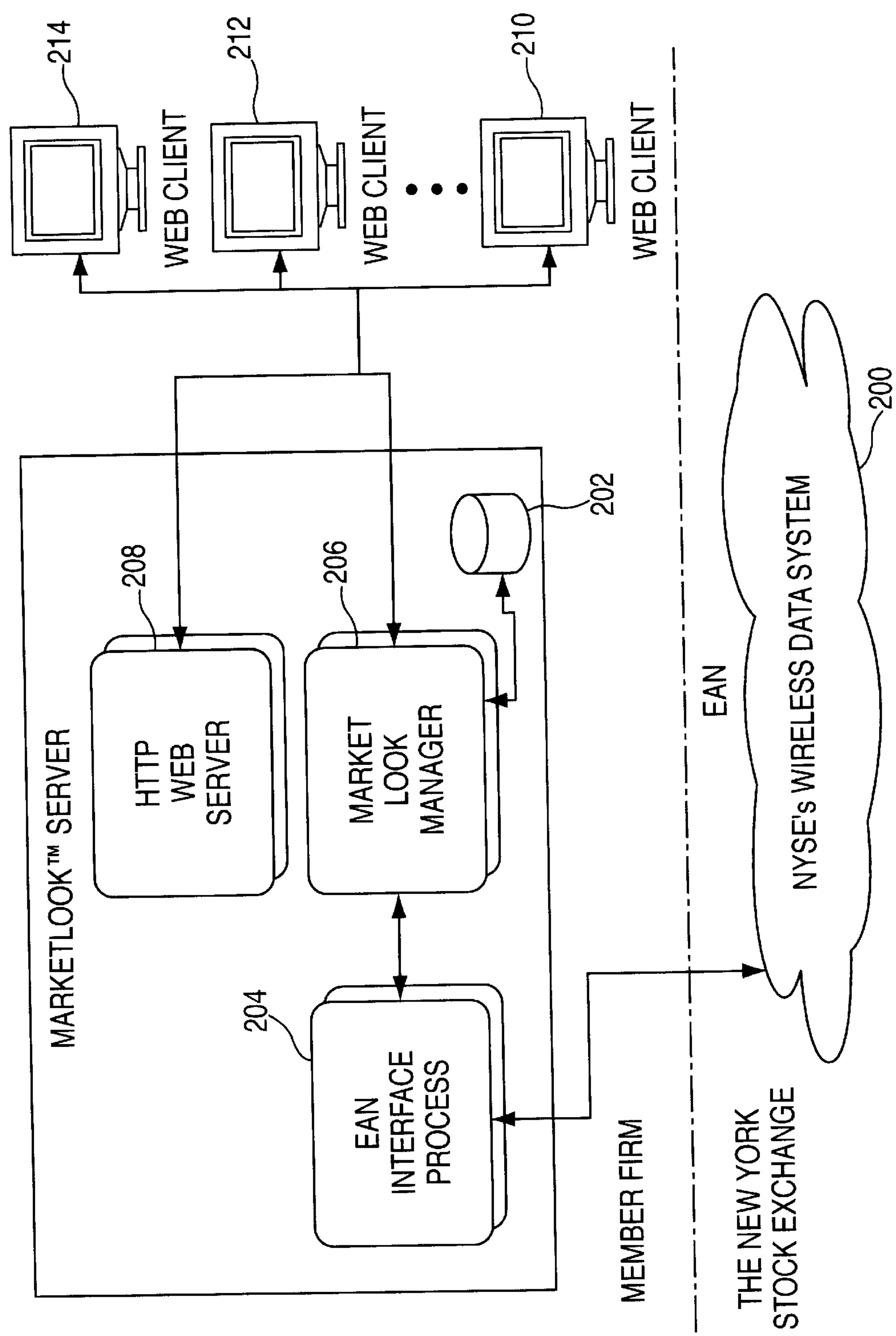
FIG. 2 is a diagram of the various software components of a preferred embodiment of the invention.

Computer server 112 would carry cut several different software processes simultaneously. Referring to FIG. 2, the processed are identified as the EAN Interface Process 204, the Market Look Manager 206, and HTTP Wet) Server 208. (These names are only used for clarity of the explanation of the preferred embodiment; naturally, these processes are classified by their functionality.)

EAN Interface Process 204 upon startup would establish a connection to the exchange network 200. EAN Interface Process 204 would monitor the connection for failures and report disconnects or other connection trouble to a critical error log that is maintained in the storage of computer server 112. EAN Interface Process 206 would perform automatic reconnection attempts when disconnects are detected. EAN Interface Process 204 would maintain connection statistics such as number of connection attempts and number of messages sent and received.

Market Look Manager 206 is responsible for the overall management and storage of information, user authentication and client profile information. The Market Look Manager 206 would perform client user authentication. Market Look Manager 206 would also route messages between EAN Interface Process 204 and HTTP Web Server 208. Market Look Manager 206 would also communicate with database 202 in which the graphic files representing the handwritten jottings and other information is stored.

HTTP Web server 208, which runs in computer server 112, serves the individual subscribers.

In the preferred embodiment, the individual subscriber would obtain access to the handwritten jotting by using a Web browser. FIG. 3 is a screen shot of the Web browser displaying the handwritten jottings. In the preferred embodiment, HTTP Web Server 208 transmits a JAVA applet to the client computer. Accordingly, many popular web browser software such as INTERNET EXPLORER or NETSCAPE NAVIGATOR could be used. However, the invention is not limited to use of JAVA applets or the use of the Web browsers on the subscribers' computers.

Figure 4:
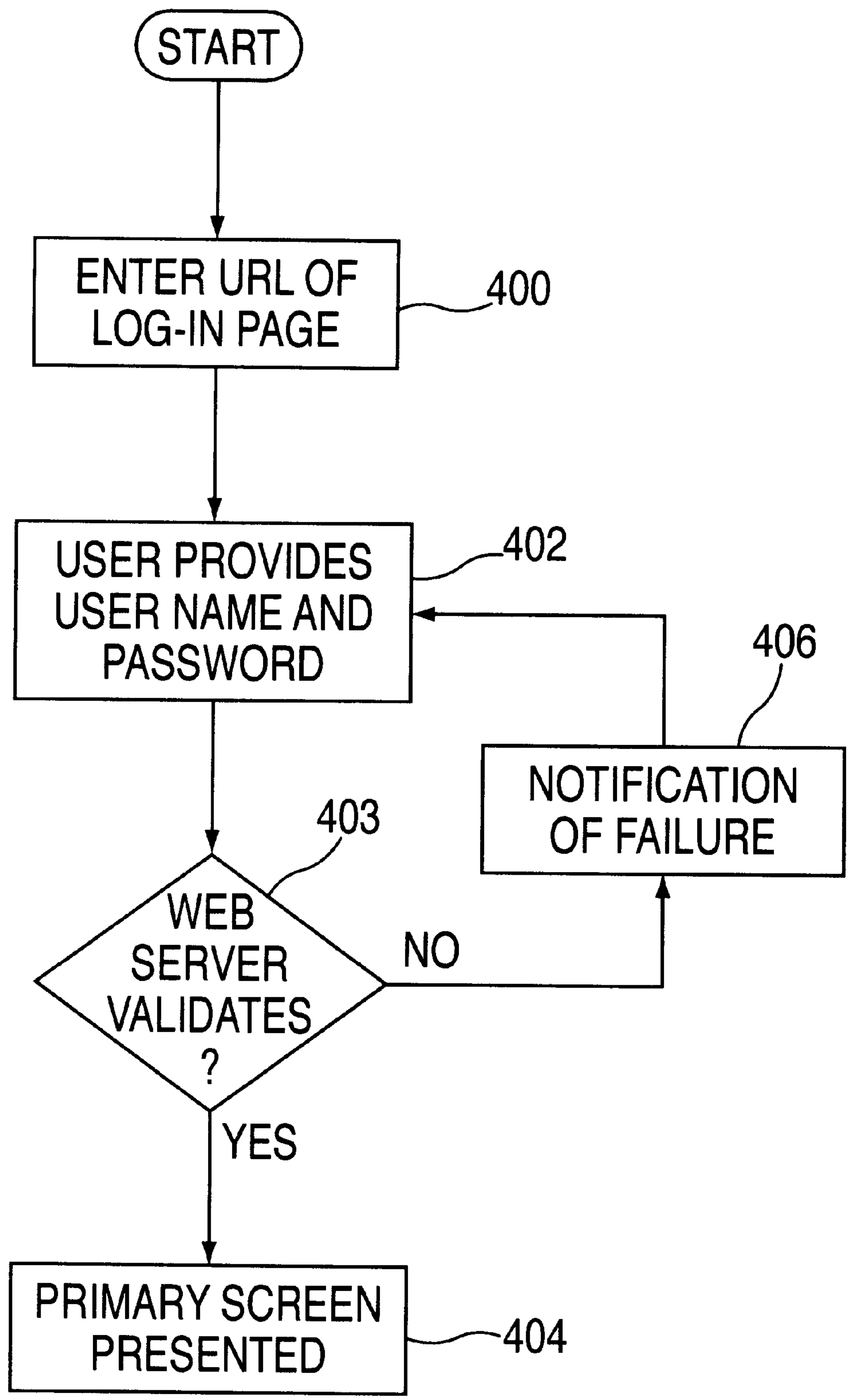
FIG. 4 is a flowchart of the steps involved in a subscriber's logging onto a preferred embodiment of the invention and obtaining information.

Referring to FIG. 4, a subscriber in step 400 would enter the uniform resource locator of the log-in Web page maintained by HTTP Web Server 208. In step 402, the subscriber would provide a user name and password. HTTP Web Server 208 recognizes the user name and password as valid then the primary screen would be presented in step 404; otherwise in step 406 the subscriber would be notified that the log-in failed and would be given a number of opportunities to complete the log-in.

The subscriber would then have a number of options. The subscriber could send a request for information to a floor broker or a booth. The subscriber could select the securities that the subscriber wished to monitor.

The subscriber could set the number of handwritten jottings that are displayed at one time.

The subscriber could also set the software to Teicker mode, in which the subscriber could click on a scrolling ticker symbol and see the handwritten jottings. The subscriber could also display a history of handwritten jottings over a predetermined period.

It will thus be appreciated that those skilled in the art will be able to devise numerous arrangements which, although not explicitly shown or described herein, embody the principles of the invention and are within its spirit and scope.

What is claimed is:

1. A method for distributing information and messages from a remote locale to one or more end-users, said method comprising the steps of:

transmitting messages said messages consisting of digital signals further comprising mail based system protocols from said remote locale to a network system server, wherein said server maintains databases for storing messages and lists of subscribing end-users;

further said messages consisting of digital signals further comprising packet architecture with data elements comprising modified tag values;

sorting and storing said incoming messages in categories and sub-categories within said server's databases, and matching the contents of said categories and sub-categories with content-specific orders received from one or more end-user;

delivering matched messages;

using software comprising mail based system protocols further comprising instant messaging software for delivering images of said matched messages to at least one corresponding end-user's web browser, wherein said delivery to end-user's browser utilizes server push technology, and said end-user need not enter any further requests or commands in order to view said matched messages; and further managing said messages comprising steps of sorting, matching and transmitting to said end-user in real time said network server's received messages.

2. The method of claim 1, wherein said information and messages comprise market looks of end-user selected stocks or commodities that are transmitted by instant messaging technology from a securities or commodities exchange floor to said network system server in real time.

3. The method of claim 2, wherein said information and messages comprise hand-written instructions.

4. The method of claim 1, wherein said network server can provide one-to-one messaging, or one-to-many messaging comprising broker interaction via mail based system protocols, further comprising extensible packet architecture.

5. The method of claim 1, wherein said remote locale is the trading floor of an exchange, and the information and messages are transmitted from said trading floor to said network server, by wireless computer to the network server, and wherein said network server transmits said messages to end-user by e-mail or server push technology.

6. The method of claim 1, wherein said network server employs a market look managing software program to organize incoming market look messages according to user information comprising authentication profile data.

7. The method of claim 1, wherein said network server delivers messages either continuously, or at pre-arranged time intervals.

8. The method of claim 1, wherein said transmission from said remote locale to said network server is by wireless telecommunications.

9. The method of claim 1, wherein said server applies an encryption algorithm to ensure secured transmission to the end-user.

10. The method of claim 1, wherein the said server's message transmissions to end users are by wired or wireless telecommunications.

11. The method of claim 1 wherein said network server provides subscriber management of transmissions of said network server further comprising the steps of:

tracking said transmissions comprising URLs;

checking said transmissions security status;

ascertaining said transmissions security of login;

transmitting said transmissions comprising requests for information from said user further at least one of said transmissions comprising floor broker or securities booth digital signals;

selecting said transmissions comprising digital signals further comprising content comprising information as well as securities that said subscribing user selects;

transmitting said digital signals from said subscribing users of said network server monitors; and displaying said transmissions.

12. The method of claim 11, further wherein said method comprises grouping from said server said subscribing end-users by at least a hierarchy of said subscribing end-users; and said hierarchy comprising at least an administrative grouping of said subscribing end-users with functionality for user information access filtering.

13. The method of claim 11, further wherein said messages consisting of digital signals are broadcast in a time period comprising real time.

* * * * *